H. C. TRIPP.
TIRE.
APPLICATION FILED NOV. 10, 1908.
1,055,573.
Patented Mar. 11, 1913.
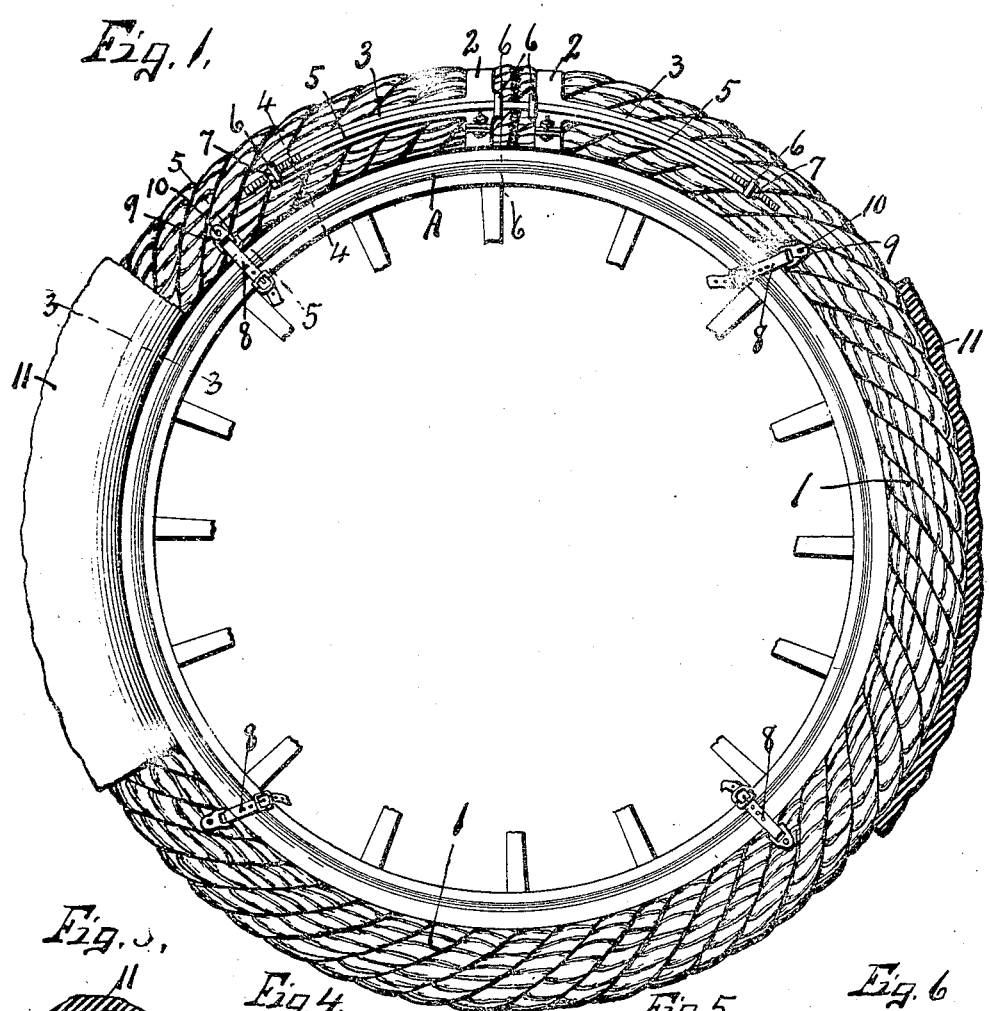
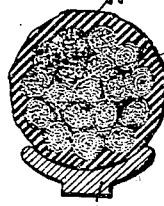
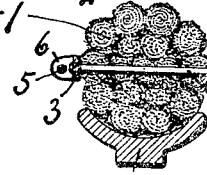
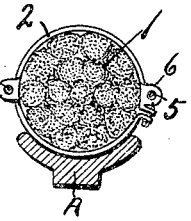
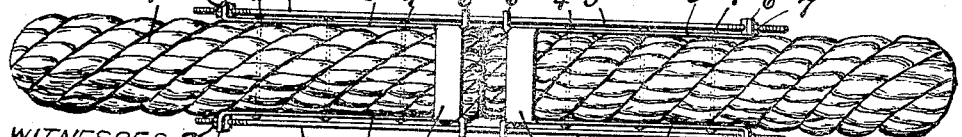
WITNESSES.
H. W. Turner.
H. E. Chase.
INVENTOR.
Henry C. Tripp
BY
Howard P. Denison
ATTORNEY.

UNITED STATES PATENT OFFICE.

HENRY C. TRIPP, OF AUBURN, NEW YORK, ASSIGNOR OF ONE-HALF TO D. EDWIN FRENCH, OF AUBURN, NEW YORK.

TIRE.

1,055,573.

Specification of Letters Patent.  Patented Mar. 11, 1913.

Application filed November 10, 1908.  Serial No. 461,952.

*To all whom it may concern:*

Be it known that I, HENRY C. TRIPP, of Auburn, in the county of Cayuga, in the State of New York, have invented new and useful Improvements in Tires, of which the following, taken in connection with the accompanying drawings, is a full, clear, and exact description.

This invention relates to certain improvements in tires for vehicle wheels and is specifically adapted as an emergency tire to be used as a substitute for the usual pneumatic tire in case the latter becomes impaired beyond further use while the vehicle is on the road.

My object is to provide a comparatively light and inexpensive emergency tire which may be conveniently carried on the vehicle for a considerable period of time without deterioration and may be easily and quickly applied to the rim of the wheel as a substitute for the usual pneumatic tire in case the latter is rendered unfit for further service. In other words I have sought to make use of twisted strands of vegetable fiber in the form of a rope cut approximately to the desired length to fit around and upon the rim of a wheel and provided with suitable clamps or adjusting means whereby the ends of the rope may be drawn together to retain the rope upon the rim thereby constituting a durable and efficient yet somewhat resilient emergency tire to enable the machine to continue on its way without material delay.

Another object is to render the rope tire impervious to moisture by saturating it with oil or equivalent substance, or coating it with rubber.

Other objects and uses relating to specific parts of the invention will be brought out in the following description.

In the drawings—Figure 1 is a side elevation of my improved tire shown as operatively mounted upon the rim of a wheel, showing also portions of the rubber coating or envelop in which the rope may be incased. Fig. 2 is a top plan of the wheel seen in Fig. 1 omitting the rubber case. Figs. 3, 4, 5 and 6 are transverse sectional views taken respectively on lines 3—3, 4—4, 5—5 and 6—6, Fig. 1.

The tire consists essentially of a rope —1— made up of a series of strands of twisted fiber such as Manila or hemp of about the same cross sectional area as standard sizes of pneumatic tires and cut to the desired length to fit snugly upon the periphery of the rim with its meeting ends in close proximity. The loose ends of the strands of the meeting ends are bound together by suitable metal bands —2— which are rigidly secured to the rope a short distance from their ends to allow the latter to be trimmed off if necessary in fitting the tire upon the wheel. Each of the bands —2— is provided with a pair of diametrically opposite arms —3— extending some distance away from the ends of the rope and rigidly secured to opposite sides thereof by bolts or rivets —4— which are passed through the strands of said rope to form convenient anchorages and guides for the clamping device such as threaded rods or bars —5— which are passed through apertured ears or lugs —6— on the bands —2— and extreme ends of the straps —3—. These straps lie wholly within the tread of the tire and are preferably curved to conform to the curvature thereof as best seen in Fig. 1. The opposite ends of the rods —5— are threaded and engaged by adjusting nuts —7— which abut against the outer end faces of the adjacent lugs or ears —6— for the purpose of tightening the rope upon the rim as —A— of the wheel.

Any suitable means may be employed for holding the rope against excessive creeping upon the rim and for this purpose I have shown the rope tire as provided with a series of clamping straps —8— which are drawn through suitable loops on the rope and are buckled around and under the rim close to one of the adjacent spokes, the loops —7— being secured to opposite sides of the rope within the tread thereof by rivets or bolts —10— as best seen in Fig. 5. The bolts —4— and —10— are preferably passed transversely through the center of the tire and through the strands thereof rather than between them thereby affording a firm anchorage and preventing shifting of the rivets lengthwise of the tire.

In order to protect the rope against the absorption of moisture, it is preferably saturated with oil and tar or may be provided with a casing or envelop —11— of soft rubber which is applied to the surface of the rope in a plastic condition and firmly pressed into the interstices thereof, thus becoming incorporated more or less with the fiber and firmly retaining the rope and its rubber casing in fixed relation. The main object, however, of this part of my invention is to provide the rope with protective medium against moisture either by applying oil and tar to the strands before twisting them into the rope or by applying the coating of rubber to the entire surface of the rope after the latter is formed.

In preparing the rope for the wheel, it is cut to the desired length corresponding to the periphery of the rim upon which it is to be fitted after which the bands —2— and their arms or straps —3— are firmly secured to the ends of the rope whereupon the rope is drawn around and upon the periphery of the rim and the clamping rods —5— passed through the apertured lugs —6— and drawn up tightly by the nuts —7— thus shortening the radius of the rope tire until firmly clamped upon the periphery of the rim, such rim being usually concaved transversely to form a convenient seat for the tire. The straps —8— may then be drawn tightly around and under the rim and buckled in their adjusted position.

What I claim is:

A hemp or Manila rope tire for vehicle wheels having its ends cut transversely to abut one against the other, bands encircling the abutting ends and having arms extending circumferentially in opposite directions therefrom, apertured guides on said bands and arms and clamping bolts passed through the apertured guides and threaded at their ends and nuts engaging said threaded ends and adjacent the apertured guides on said arms for drawing the meeting ends of the rope together.

In witness whereof I have hereunto set my hand this 7th day of November 1908.

HENRY C. TRIPP.

Witnesses:
  D. EDWIN FRENCH,
  CLARA M. FRENCH.